United States Patent
Harden et al.

(10) Patent No.: US 11,114,868 B2
(45) Date of Patent: Sep. 7, 2021

(54) SUPPLEMENTAL CAPACITOR BASED BATTERY CHARGING SYSTEM

(71) Applicant: BBY SOLUTIONS, INC., Richfield, MN (US)

(72) Inventors: Kenneth Harden, Eden Prairie, MN (US); Farhad Nourbakhsh, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 371 days.

(21) Appl. No.: 16/295,049

(22) Filed: Mar. 7, 2019

(65) Prior Publication Data
US 2020/0287395 A1    Sep. 10, 2020

(51) Int. Cl.
*H02J 7/00*     (2006.01)
*H02J 7/34*     (2006.01)
*H01G 11/04*    (2013.01)
*H02J 7/06*     (2006.01)

(52) U.S. Cl.
CPC .......... *H02J 7/0029* (2013.01); *H01G 11/04* (2013.01); *H02J 7/00* (2013.01); *H02J 7/06* (2013.01); *H02J 7/345* (2013.01); *H02J 7/00302* (2020.01)

(58) Field of Classification Search
CPC .......... H02J 7/345; H02J 7/0029; H02J 7/06; H01G 11/04
See application file for complete search history.

(56) References Cited

U.S. PATENT DOCUMENTS

| | | | |
|---|---|---|---|
| 9,774,201 B2 | 9/2017 | Voller et al. | |
| 10,116,153 B2 | 10/2018 | Chen et al. | |
| 2012/0045688 A1 | 2/2012 | Liu et al. | |
| 2014/0111015 A1* | 4/2014 | Fall | H02J 7/35 307/66 |
| 2014/0321027 A1 | 10/2014 | Nguyen et al. | |
| 2016/0285289 A1* | 9/2016 | Arends | H02J 7/342 |
| 2016/0365613 A1 | 12/2016 | Fan | |

OTHER PUBLICATIONS

Indiegogo, Zap&Go First Graphene Supercapacitor Charger, https://www.indiegogo.com/projects/zap-go-first-graphene-supercapacitor-charger#/, 15 pages.

* cited by examiner

*Primary Examiner* — David V Henze-Gongola
(74) *Attorney, Agent, or Firm* — Forsgren Fisher; Daniel A. Tysver; James M. Urzedowski (57) ABSTRACT

A system and method are presented relating to a hybrid portable charging device having an internal battery and an internal supercapacitor. Input logic is implemented as part of the management system for the charging device. In one embodiment, input power is analyzed to determine whether the input power level is low, medium, or high, with input power being diverted to the battery or supercapacitor depending on the determined input power level. At high input power, the supercapacitor is charged first. At low input power, the battery is charged first. At medium power, the input power is split between the supercapacitor and the battery. In another embodiment, output can be directed using output logic so that power flows first from the supercapacitor so that the supercapacitor is fully discharged before battery power is output to the load on the charging device.

20 Claims, 6 Drawing Sheets

| STATE | RESULT |
|---|---|
| Input Power is Below Maximum Battery Charging Power Level | First Charge Battery, Charge Capacitor only if Battery Full |
| Input Power is Above Maximum Battery Charging Power Level but Below High Level | Split Charge, with Max Battery Charging Level Diverted to Battery, Remainder to Capacitor |
| Input Power is at High Level | First Charge Capacitor, Charge Battery only if Capacitor Full |

SUPPLEMENTAL CAPACITOR BASED BATTERY CHARGING SYSTEM

FIELD OF THE INVENTION

This application is directed to the field of providing power to rechargeable electronic devices using a portable charging device. More particularly, the disclosure is related to a portable charging device that contains a supercapacitor and a battery, and a method for operating such a device.

SUMMARY

A portable charging device for charging an electronic device can be configured to have a housing, an input power port or cable, and an output power port or cable. Input power may be received as either DC or AC power. If AC power is accepted, the charging device includes a power supply to convert the alternating current to the DC power that will be used by the internal components of the charging device. The output power port provides DC power to an external mobile device, such as a smart phone, a tablet device, or a laptop computer.

Inside the housing is a power management system, a supercapacitor, and a battery. The power management system utilizes a processor operating under programming instructions to control electrical distribution inside the charging device. The power management component of the charging device includes subcomponents that monitor and manage the supercapacitor and the battery. In one embodiment, the power management system can be considered to have separate logic or components for input power management, standby power, and output power management.

The input portion of the power management system identifies the amount of power that the charging device receives, as well as the charge status of the battery and supercapacitor, in order to apportion the incoming power between the battery and the supercapacitor. In one embodiment, power is always diverted to the supercapacitor until the supercapacitor is charged, and then power is directed to the charging circuitry of the battery. When the battery is being charged, a trickle current is still diverted to maintain the supercapacitor in the fully charged condition. In a second embodiment, the power management component identifies the level of input power being received by the charging device. If the input power level is high, all of the power is diverted first to the supercapacitor until it reaches full charge. If the amount of power being received isn't considered "high," but nonetheless exceeds the maximum current that can be used to charge the battery, the maximum battery charging current is sent to the battery with the excess current being diverted to charging the supercapacitor. If the input power level is below this maximum level, then all power goes into charging the battery of the charging device.

Similarly, the power management component includes output logic that monitors the battery and the supercapacitor to determine which element will supply power to any load that is connected to the output power port of the charging device. If a load is present, the output power management subcomponent selects a source of power for the load. In one embodiment, the output logic will always select the supercapacitor for providing power until the supercapacitor is drained. At that point, the output power management subcomponent will draw power from the battery. In a second embodiment, the battery is the primary supplier of power to the load. The charge of the supercapacitor is used in the second embodiment only to charge the battery. If the load drains the battery sufficiently, all of the charge in the supercapacitor will have been sent to the battery in order to maintain its charging level as much as possible.

The standby logic operates when the charging device is neither being charged nor supplying power to the load. The standby logic is responsible for ensuring that the charge in the supercapacitor is used to charge the battery. Even when the battery is fully charged and the supercapacitor has power remaining, the output power management component will still monitor the charge level of the battery and, whenever necessary, will use the power of the supercapacitor to keep the battery fully charged.

DETAILED DESCRIPTION

Charging Device 100

Figure 1:
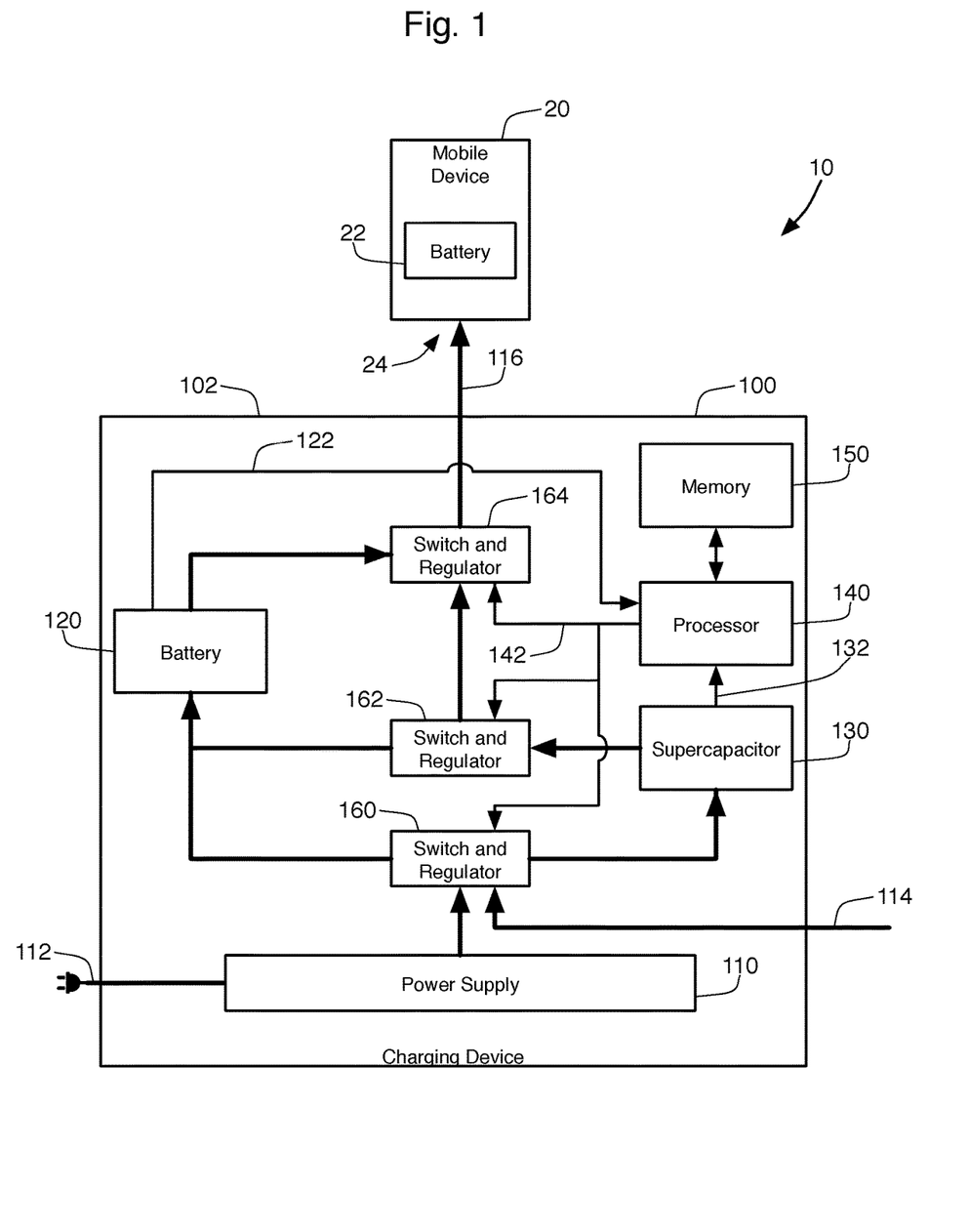
FIG. 1 is a schematic view of one embodiment of a charging device of the present invention.

FIG. 1 shows a first embodiment of a charging device 100. The charging device 100 is considered a portable device, meaning that the charging device 100 is encapsulated into a case 102 that can be easily transported from place to place by a user. In the preferred embodiment, the charging device 10 will fit into the pocket of a user. The charging device 100 is intended to be used similar to a portable battery bank in that it provides recharging power to a mobile device 20. The mobile device 20 is a portable electronic device, such as a cell phone, smart phone, tablet, or laptop computer, that operates using an internal battery 22. The charging device 100 has an output charging cable 116 that connects to the power or charge input 24 of the mobile device 20. Power from the charging device 100 can then flow through the output charging cable 116 into the mobile device 20 to charge the internal battery 22 of the mobile device 20. The output charging cable 116 can be permanently attached to the housing 102 of the charging device 100. Alternatively, the charging device 100 can incorporate an output power port into which the charging cable 116 can be inserted. For example, the charging cable 116 could take the form of a USB cable, and the charging device 100 could provide a USB port (such as a female USB-C socket) that receives one end of the USB cable. In the present disclosure, the term "port" will be used to refer to either a male or female connector.

The charging device 100 receives power from one of two inputs 112, 114. The first input is an AC input 112 that plugs into a wall socket to receive AC power, traditionally at either 110 or 220 volts. Because the internal components of the charging device 100 rely upon DC power, AC input 112 is connected to a power supply 110 that converts the AC power to direct current for the components. The second input 114 receives DC power from outside the case 102 of the charging device 100. There is no need for DC power to pass through the power supply 110, so the DC input 114 is shown in FIG. 1 as connecting to the output of the power supply 110. While the power supply 110 will provide the internal circuitry of the charging device 100 a predetermined wattage of power, the power available on the DC input may vary. Like the output cable 116, the AC input 112 and the DC input 114 can take the form of cables that are permanently attached to the housing 102 or can be independent power cables that attached to ports embedded into the housing 102. Furthermore, there is no need for the charging device 10 to have both AC power input 112 and DC power input 114. Many embodiments will have only one type of power input 112, 114. Finally, it is noted that the DC power input 114 can itself be the output of an external power supply (such as a power "brick") that connects to an AC power outlet.

In one embodiment, DC power is supplied through input 114 through a USB-C (type-C USB) interface port. This USB-C interface port is capable of supplying power up to 20 volts and 5 amps, resulting in 100 watts of power being delivered through the DC input 114. Although 100 watts is the maximum power receivable using the current USB-C power specifications, these specifications allow for five different power profiles that can be negotiated between devices. These different profiles range from a low of 10 and 18 watts to the higher end of 60 or 100 watts. In one embodiment, power supply 110 provides one hundred watts of DC power when connected to an AC wall outlet.

The charging device 100 stores the power it receives from power inputs 112, 114 so that it can be unplugged from these inputs 112 and still provide charging power to the mobile device 20. The received power is stored in both a battery 120 and a supercapacitor 130. Although only a single battery 120 and capacitor 130 is shown in FIG. 1, the preferred embodiment may be implemented with multiple batteries operating in parallel as a larger battery 120 or multiple capacitors operating in parallel as a larger capacitor 130. In fact, third-party battery "packs" can be obtained that group a plurality of battery cells into an individual unit. Such batteries and battery packs are frequently packaged with their own electronic circuitry that includes interconnects that connect various batteries within the pack together, as well as management circuitry (not shown in FIG. 1) that helps control the charging and discharging of the battery. Such circuitry can be considered a battery-specific management system and is separate from the management system of the entire charging device 100 (as described below in connection with FIG. 2). The battery-specific management system can optimize the charging of the battery 120 based on the electro-chemical characteristics of the individual battery cells. Furthermore, battery-specific management systems can provide information to other componentry within the charging device 100 concerning the charge status of their batteries.

The battery 120 of the charging device 100 can be constructed in a variety of ways. In one embodiment, the battery 120 comprises one or more Lithium-Polymer batteries, such as the MicroElectronika (Belgrade, Serbia) SR674361P battery rated at 3.7V and 2000 mAh.

The capacitor 130 is shown in the figures as a "supercapacitor." Supercapacitors (also known as ultracapacitors) generally use electrochemical pseudocapacitance and/or electrostatic double-layer capacitance to hold the charge within the capacitor. In one embodiment, the supercapacitor 130 is constructed using cylindrical electrochemical double-layer capacitors such as the AVX Corporation (Fountain Inn, S.C.) SCC Series SCCV40E506SRB. These capacitors have specifications of 50F and 3V rating and provide up to 225 Joules of energy. The capacitor 130 can be constructed with multiple capacitors (such as a range from 2 to 10 capacitors), with the number of capacitors selected based on the specification of each individual capacitor, as well as the target size, weight and load for the charging device 100. Although it is not shown in FIG. 2, the supercapacitor 130 can incorporate its own capacitor-specific management system to handle the particular charging and discharging characteristics of the various capacitive components inside the supercapacitor 130, as well as to provide charge status information to other componentry.

The use of both a battery 120 and a supercapacitor 130 to hold the charge in the charging device 100 means that the device 100 is considered a hybrid power device. Hybrid devices combine the long-term power storage capabilities of traditional batteries with the quick charging characteristics of a supercapacitor. While such hybrid systems have been developed in the past and used in various devices, such as in electric vehicles, charging device 100 uses a unique monitoring and regulation system for controlling the input and output power of the charging device 100 in a manner specially designed to provide recharging power to a mobile device 20.

Charging device 100 utilize this hybrid battery 120 and capacitor 130 system to store charge from an external power input 112, 114 in order to provide power at a later time to mobile device 20. The charging device 100 utilizes a processor 140 to manage the power inputs 112, 114 and output 116 of the device 100. In order to provide this management, switching and regulating components 160, 162, 164 under control of the processor 140 direct the flow of power through the charging device 100. Component 160, for instance, determines whether and how much power from inputs 112, 114 flows to the battery 120 or the supercapacitor 130, or to both. Component 162 controls the output of the supercapacitor 130 and determines whether power flows to the internal battery 120 of the charging device 100 or to the output port 116 to charge the mobile device 20. Component 164 controls power from the supercapacitor 130 and power from the battery 120 to determine the source of power leaving the charging device through output 116. In the preferred embodiment, the components 160, 162, and 164 can both act as a switch to control the flow of electricity within the charging device, and as a power and/or voltage regulator to control or limit the voltage or power passing through the component 160, 162, 164. For example, component 164 can form part of a system that negotiates charging parameters (voltage and amperage) with the mobile device 20 and establishes the proper power profile on output 116 so that it will be acceptable by the mobile device 20. The actual implementation of the switches and regulators 160-164 in the physical implementation of the charging device 100 does not need to duplicate the arrangement shown in FIG. 1. For example, the power going from the supercapacitor 130 to component 164 flows first through component 162 in the control logic of FIG. 1. There is no need to implement this particular current flow in the actual implementation, as a direct current path could flow directly from the supercapacitor 130 to the final switching and regulator component 164. FIG. 1 should therefore be considered more of a logic diagram than a requirement for a specific electrical layout.

In order to properly control these components 160, 162, 164 (and consequently control the charging and discharging of the battery 120 and capacitor 130), the processor 140 receives signals 122, 132 from the battery 120, and capacitor 130, respectively. The processor 140 also receives information concerning the DC power provided through input 114, which is not explicitly shown in FIG. 1. The processor 140 then operates under the control of programming stored in memory 150 to manage the input and output power for the charging device 100. Any programmatically controlled processor 140 can be used in the charging device 110, including a microcontroller (such as the MSP430 from Texas Instruments Inc., Dallas, Tex.) or a RISC microprocessor (such as those designed by Arm Holdings PLC, Cambridge, England).

Figure 2:
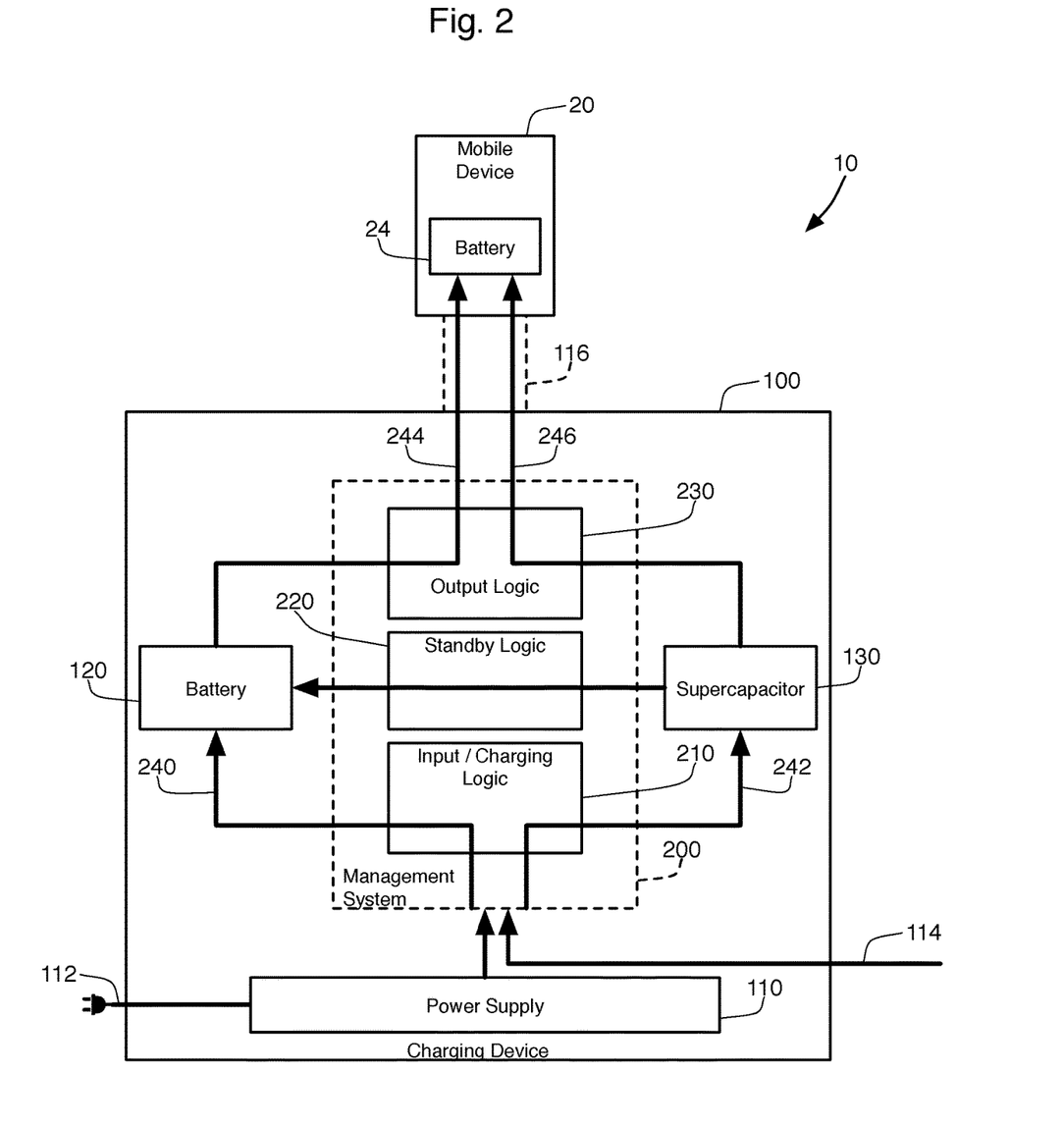
FIG. 2 is a schematic view of the charging device of FIG. 1 grouping elements into a management system.

The processor 140, the programming within memory 150, the switch and regulator components 160-164, and the signals 122, 132 together form the management system 200 for the charging device, as is shown in FIG. 2. In FIG. 2, the individual components of the management system 200 are removed and replaced by a single element 200. This element 200 is shown with three internal logic subcomponents, namely input or charging logic 210, standby logic 220, and output logic 230. This visualizes the three primary tasks of the management system 200.

The first of these tasks is the input logic 210, which controls the provision of input power 112, 114 to the battery 120 and supercapacitor 130. Visually, this is shown through the use of two separate lines 240, 242 on FIG. 2 leaving the power supply 110 or the DC input 114. The first line 240 supplies power to the battery 120 and the second 242 supplies power to the supercapacitor 130. Both lines 240, 242 pass through the input logic 210 of the management system 200, indicating that this portion 210 of the management system 200 controls this power input. The lines of power flow in FIG. 2 should be considered an abstract representation of power and electric flow, rather than as separate electrical wiring that is used in a physically constructed embodiment of charging device 100.

The second task of the management system 100 is performed by the standby logic 220. This logic 220 controls the flow of power between the supercapacitor 130 and the battery 120 when the charging device 100 is not connected to an input power source 112, 114.

The third task is the output logic 230, which controls the source of power for output 116. As seen in FIG. 2, the battery 120 is shown providing power to output 116 through line 246, and the supercapacitor provides power to output 116 through line 242. Both lines 244, 246 pass through output logic 230 of the management system, indicating that this output is under the control of logic 230.

Input/Charging Logic

Figure 3:
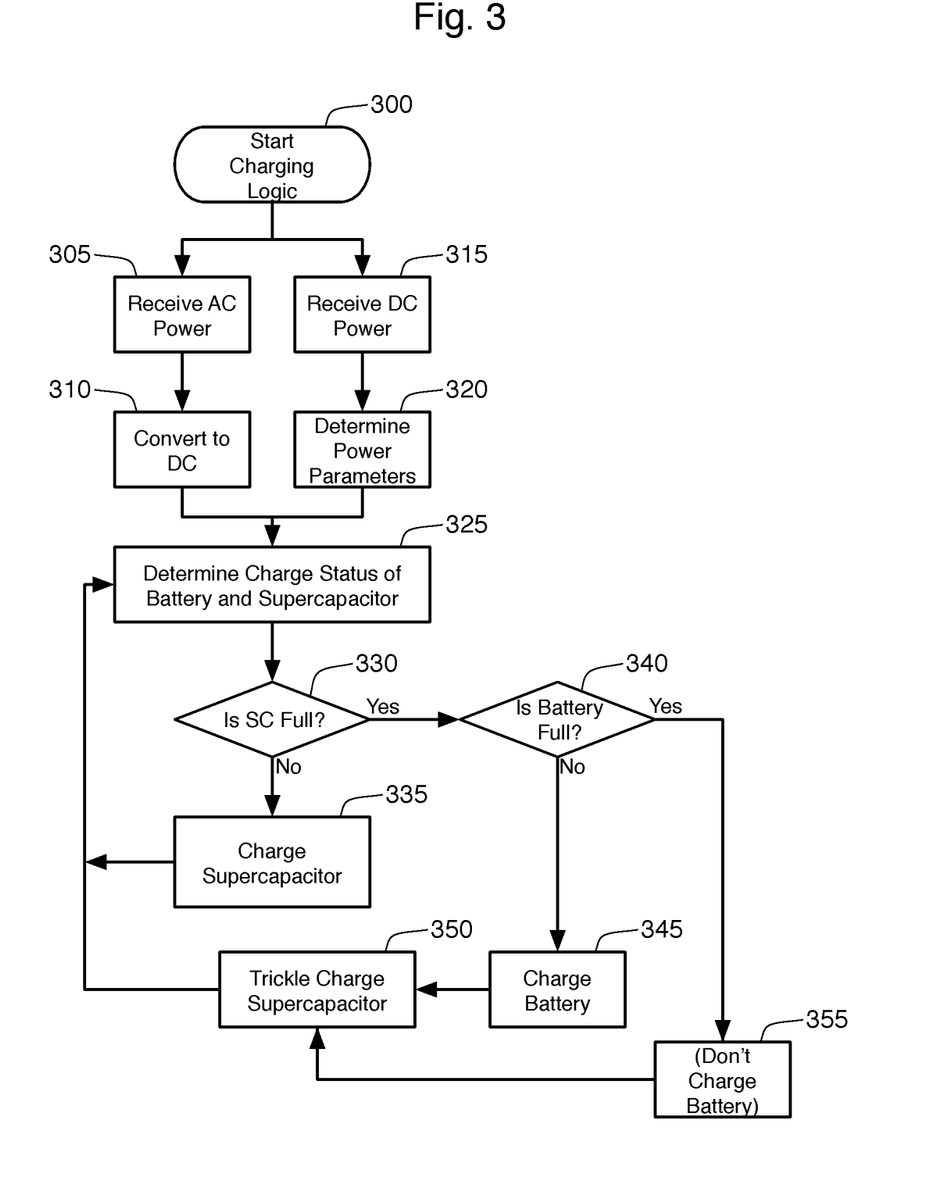
FIG. 3 is a flow chart of charging logic performed by the management system of FIG. 2.

FIG. 3 is a flow chart showing a method 300 for implementing the input or charging logic 210 of the management system 200. In practice, the logic for method 300 shown in FIG. 3 will be implemented by processor 140 using the internal physical components (including elements 160-164) of the charging device 100. The method 300 starts by receiving AC power through input 112 (step 305) or by receiving DC power through input 114 (step 315). AC Power will need to pass through the power supply 110 to be converted into DC power, which occurs at step 310. Because the output of the power supply 110 will be known to the management system 200, there is no need to measure or otherwise determine the input power received through this path 305, 310. In contrast, the DC power received through input 114 at step 315 could have various power parameters (voltage and amps). The method 300 determines these parameters at step 320 for use later in the method 300.

Whether power is received through the AC power input 112 or DC power input 114, step 325 is responsible for determining the charge status of the battery 120 and the supercapacitor 130 at step 325. As mentioned above, the battery 120 and the supercapacitor 130 may each be composed of multiple cells or capacitors, respectively, and can each contain their own specific management system that manages charging and discharging, and provides charge status information to external components. At step 325, the charging device management system 200 uses the systems and capabilities provided by the battery 120 and supercapacitor 130 to read the charging status of these components 120, 130.

At step 325, the management system 200 determines whether or not the supercapacitor 130 is fully charged. If not, the method 300 will supply the incoming power to the supercapacitor 130 at step 335. The goal in this method 300 is to first charge the supercapacitor, thus step 335 will always supply power first to the supercapacitor 130 if it is not fully charged. The method 300 then returns to step 325 to monitor the charge status of the battery 120 and supercapacitor 130. As long as the capacitor 130 remains less than fully charged, step 335 will cause the power to flow to the capacitor 130.

If step 330 determines that the supercapacitor 130 is full of charge, step 340 will analyze whether the battery 120 is fully charged. If not, the incoming power will be directed to the battery 120 at step 345. During this battery charging, it may be necessary to provide a trickle charge to the capacitor to keep it fully charged. This occurs at step 350. Effectively, switch and regulator component 160 extracts a small portion of the incoming power (a "trickle") and reroutes it to the supercapacitor 130 to maintain its full charge level. If step 340 determines that the battery is full, then there is no need to charge the battery (indicated by "step" 355 in FIG. 3, although no activity actually takes place at this step). Nonetheless, the method 300 will still provide a trickle charge to the supercapacitor 130 at step 350. In many cases, a trickle charge will also be provided to the batter 120 so that it too is maintained at full charge.

Figure 4:
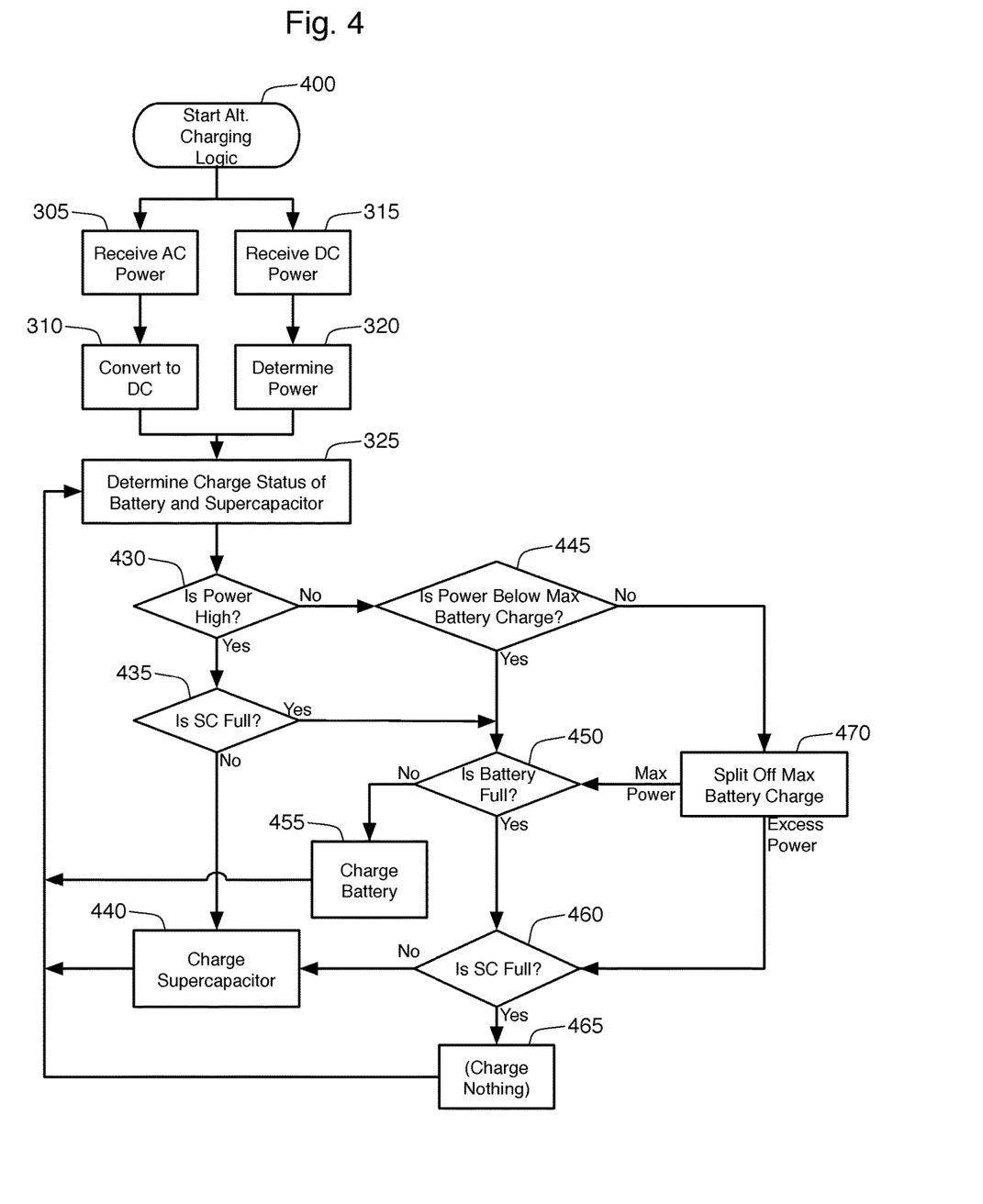
FIG. 4 is a flow chart of an alternative embodiment of the charging logic.

FIG. 4 shows an alternative method 400 for implementing the input or charging logic 210 of the management system. While method 300 focused on first charging the supercapacitor 130 and keeping the supercapacitor 130 fully charged, method 400 is more sophisticated and determines its charging patterns based on the power level being received by the charging device 100. The first few steps of method 400, namely step 305-325 on FIG. 4, are the same as occurred in method 300, and therefore are labeled with the same figure numbers as those used in FIG. 3.

The first new step in method 400 is step 430, which asks whether the currently provided input power level is "high." The amount of power or watts coming in on the power input lines 112, 114 required to meet the "high" level can vary according to the particular parameters of the components of the charging device 100. In the preferred embodiment, the various power levels analyzed in method 400 are based upon the maximum wattage that can be used to charge battery 120. In one embodiment, the battery 120 and its battery-specific management system can handle less than 20 watts at a maximum. In this context, 100 watts of incoming power would be significantly greater than the power that could be used by the battery's management system to charge the battery 120, so 100 watts would qualify as a high input power level under step 430. Mathematically, anything greater than two times the maximum charging power capabilities of the battery 120 will be considered "high power."

If step 430 determines the input power level is high, step 435 determines if the supercapacitor 130 is full. If not, then step 440 will send all of the input power to the supercapacitor 130. A high level of input power will quickly charge the supercapacitor 130, which therefore should not significantly delay the charging of the battery 120.

If step 430 determines that the input power level is not "high," then step 445 determines if the input power is below the maximum charging power capabilities of the battery 120. If so, all power will go to charging the battery 120. To accomplish this, step 450 first determines if the battery 120 is already fully charged. If not, then step 455 will supply the all the input power to charging the battery. If the battery 120 is determined to be fully charged at step 450, then step 460 determines if the supercapacitor 130 is itself fully charged. If not, the method 400 supplies the input power to charge the supercapacitor 130 at step 440. If the supercapacitor 130 is found to be full at step 460, then nothing is charged (step 465). Note that if step 435 determined that the supercapacitor 130 is full, the method 400 would then use the max input power to charge the battery 120, starting at step 450.

If the input power is greater than the maximum charging power capabilities of the battery 120, but not quite at the high level, then step 470 is reached in method 400. At this step, the management system 200 will split the input power between the battery 120 and the supercapacitor 130. The battery 120 is given the maximum power that it can use in its recharging process starting at step 450, with excess power beyond that amount being diverted to charging the supercapacitor 130 starting at step 460. Of course, the power provided to the battery 120 will be used by the battery 120 only if step 450 determines that the battery 120 is not already fully charged. If the battery 120 is fully charged, the total amount of the power will be available at step 460. If the battery 120 is not full, step 455 will uses the maximum power from step 470 to charge the battery 120, while steps 460 and 440 will use the excess power to charge the supercapacitor 130.

Figure 5:
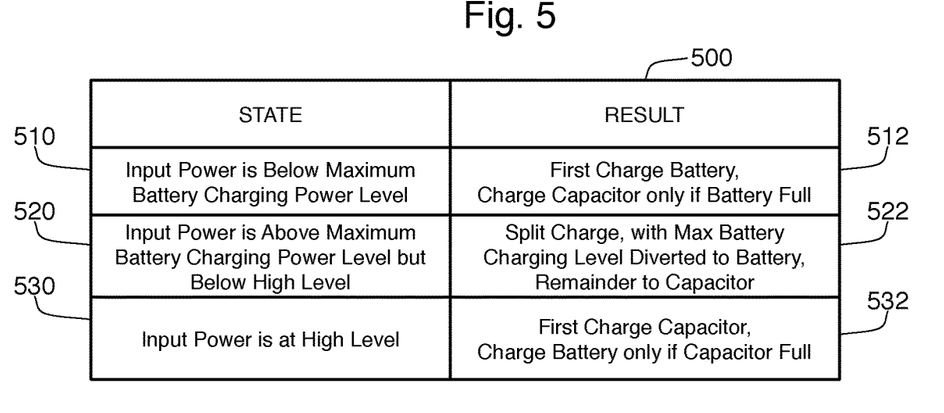
FIG. 5 is a table that outlines the various states implemented by the charging logic shown in FIG. 4.

The method 400 of FIG. 4 can be simplified according to chart 500 shown in FIG. 5. Three states 510, 520, 530 are presented in this chart 500. In the first state 510, the input power is below the maximum power that can be used to charge the battery 120. The result 512 for this state 510 is that the battery 120 is charged first, with the supercapacitor 130 being charged only if the battery 120 is fully charged. The second state 520 indicates that the input power is above the maximum level for charging the battery 120, but below the "high" level. During this state 520, the method 400 generates the result 522 of splitting the charge so that the maximum usable by the battery 120 is used to charge the battery 120, with the excess power being used to charge the supercapacitor 130. The third state 530 exists when the input power is "high." In this state 530, the method 400 produces the result of using all power to charge the supercapacitor 130, with the battery 120 being charged only if the supercapacitor 130 if fully charged.

Standby Logic

Figure 6:
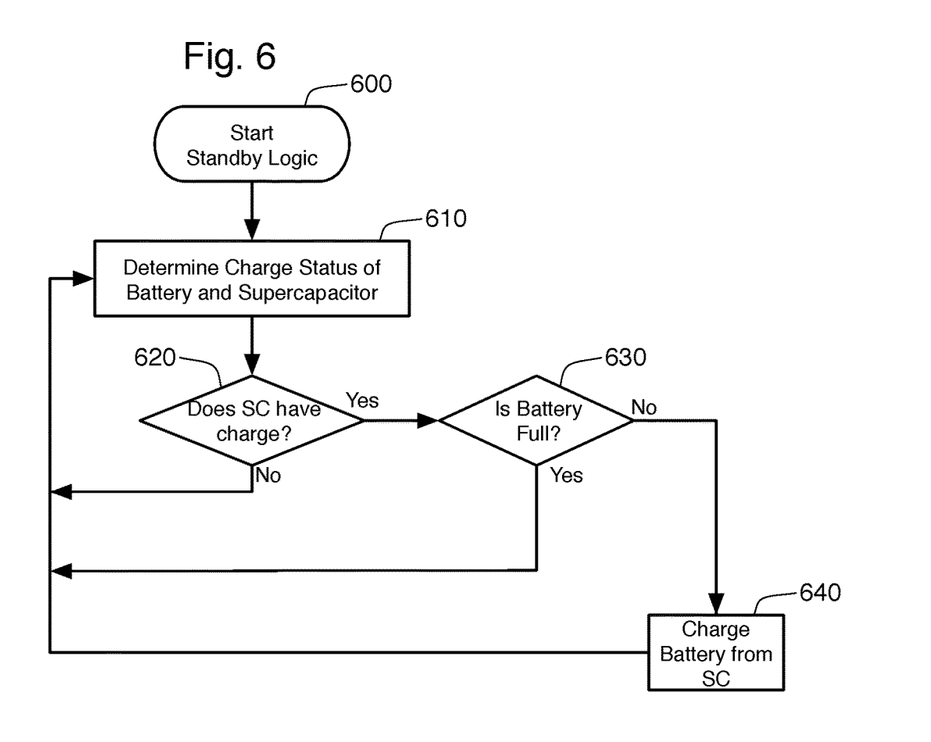
FIG. 6 is a flow chart of standby logic performed by the management system of FIG. 2.

FIG. 6 shows a method 600 for implementing the standby logic 220 of management system 200. The first step is to determine the charge status of the battery 120 and the supercapacitor 130, as was done in step 325 described above. Step 620 determines whether or not the supercapacitor 130 contains any charge. If not, then standby logic 600 does not perform any function. If, however, the supercapacitor 130 contains some charge, then step 630 determines whether or not the battery 120 is fully charged. If not, then the standby logic 200 will cause the charge in the supercapacitor 130 to be used to charge the battery 120 at step 640. If the battery 120 is determined to be full at step 630, no process is performed by the standby logic 220 (at least until the battery 120 is no longer fully charged).

Output Logic

Figure 7:
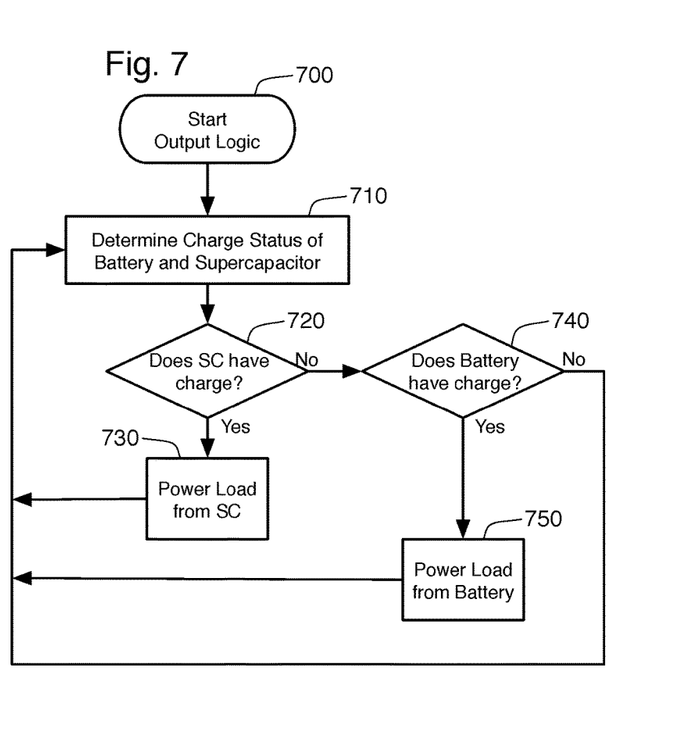
FIG. 7 is a flow chart of output logic performed by the management system of FIG. 2.

FIG. 7 shows one method 700 for implementing the output logic 230 of the management system 200. The first step of this method 700 is, once again, to determine the charge status of the battery 120 and supercapacitor 130 at step 710. If the supercapacitor 130 is determined to have a charge at step 720, then the output logic 230 will cause any load at the output 116 of the charging device 100 to be powered by the charge on the supercapacitor 130 (step 730). The power generated by discharging the supercapacitor 130 will be controlled by the supercapacitor-specific management system that is customized for the construction of the supercapacitor 130, as described above. Ideally, the supercapacitor 130 will be able to fully power the load on output 116 based on its own discharge capabilities at step 730 without using any power from the battery 120. In some embodiments, some power from the battery 120 will be needed to supplement the supercapacitor 130 at step 730, but the majority of power for the load will come from the supercapacitor 130.

If the output logic 230 implemented through method 700 determines that the supercapacitor 130 does not contain sufficient charge to power the load at step 720, then step 740 determines whether or not the battery 120 contains a charge. If so, the load on output 116 is powered or recharged through the battery 120 at step 750. Like the supercapacitor 130, the discharging of the battery 120 may be controlled by a battery-specific management system. If step 740 determines that the battery 120 also fails to have enough charge to power the load, no power is provided through output 116.

Figure 8:
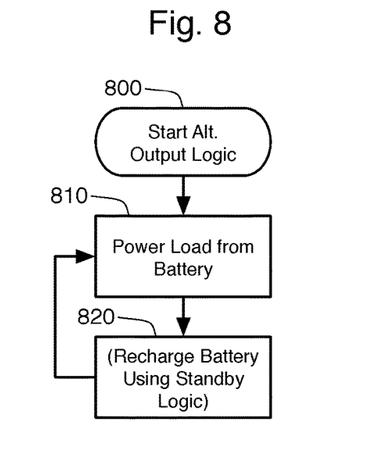
FIG. 8 is a flow chart of an alternative embodiment of the output logic.

Method 800 shown in FIG. 8 provides an alternative embodiment of the output logic 230. In this case, the method 800 will always power the output 116 through the battery 120 at step 810. The supercapacitor 130 is used at step 820 only to recharge the internal battery 120 of the portable charging device 100. The standby logic of method 600 can be used to perform this step 820. If method 800 is implemented instead of method 700, the standby logic of method 600 can be allowed to operate whenever the charging device 100 is not receiving power through inputs 112, 114 (whether or not a load 20 is present on the output 116). If method 700 is implemented, the standby logic of method 600 may be paused whenever a load 20 is present on the output 116.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A portable charging device comprising:
   a) a case;
   b) a charging device power input receiving input power;
   c) a charging device power output;
   d) a battery located within the case, the battery having a battery input, a battery output, and a battery charge status output;
   e) a supercapacitor located within the case, the supercapacitor having a supercapacitor input, a supercapacitor output, and a supercapacitor charge status output;

f) a processor operating according to instructions causing the processor to implement a charging device management system; and g) the charging device management system having an input logic that, upon determining that there is input power on the charging device power input:
   i) receives the battery charge status output and the supercapacitor charge status output,
   ii) determines whether the input power on the charging device power input is at a low, medium, or high level,
   iii) upon determining that the input power is at the high level, diverts all input power to the supercapacitor input until the supercapacitor charge status output indicates that the supercapacitor is fully charged,
   iv) upon determining that the input power is at the low level, diverts all input power to the battery input until the battery charge status output indicates that the battery is fully charged, and
   v) upon determining that the input power is at the medium level, divides the input power into a first portion that is diverted to the battery input and a second portion that is diverted to the supercapacitor input.

2. The portable charging device of claim 1, wherein the first portion of the input power is comprises a fixed power amount, and the second portion comprises an excess of the input power beyond the fixed power amount.

3. The portable charging device of claim 2, wherein the fixed power amount comprises a maximum amount of power that can be used to charge the battery at the battery input.

4. The portable charging device of claim 1, further comprising:
   h) the charging device management system having an output logic that, upon determining that there is a load on the charging device power output:
      i) receives the battery charge status output and the supercapacitor charge status output,
      ii) upon determining that the supercapacitor contains charge, powers the load on the charging device power output through the supercapacitor output, and
      iii) upon determining that the supercapacitor does not contain charge and the battery does contain charge, powers the load on the charging device power output through the battery output.

5. The portable charging device of claim 4, further comprising:
   i) the charging device management system having a standby logic that, upon determining that there is no input power on the charging device power input and that there is no load on the charging device power output:
      i) receives the battery charge status output and the supercapacitor charge status output,
      ii) upon determining that the supercapacitor contains charge and that the battery is not fully charged, recharges the battery using the charge contained in the supercapacitor.

6. The portable charging device of claim 1, further comprising:
   h) the charging device management system having an output logic that powers a load on the charging device power output through charge contained in the battery while using charge contained in the supercapacitor to recharge the battery.

7. The portable charging device of claim 1, wherein the portable charging device power input receives DC power.

8. The portable charging device of claim 7, wherein the power input comprises a USB-C port.

9. The portable charging device of claim 1, wherein the portable charging device further comprises an AC power input and a power supply that converts the AC power to DC power, further wherein the power supply always produces input power at the high level.

10. A portable charging device comprising:
    a) a case;
    b) a charging device power input receiving input power;
    c) a charging device power output;
    d) a battery located within the case, the battery having a battery charge status output;
    e) a supercapacitor located within the case, the supercapacitor having a supercapacitor charge status output;
    f) a processor operating according to instructions causing the processor to implement a charging device management system; and
    g) the charging device management system having an input logic that, upon determining that there is input power on the charging device power input:
       i) receives the battery charge status output and the supercapacitor charge status output,
       ii) upon determining that the supercapacitor is not full, using the input power to charge the supercapacitor, and
       iii) upon determining that the supercapacitor is full and that the battery is not full, using the majority of the input power to charge the battery while providing a trickle charge to the supercapacitor to maintain the supercapacitor at full charge.

11. The portable charging device of claim 10, wherein the input logic further provides trickle charges to the battery and supercapacitor when the battery charge status output and the supercapacitor charge status output both indicate a full charge.

12. The portable charging device of claim 10, further comprising:
    h) the charging device management system having an output logic that, upon determining that there is a load on the charging device power output:
       i) receives the battery charge status output and the supercapacitor charge status output,
       ii) upon determining that the supercapacitor contains charge, powers the load on the charging device power output using the supercapacitor, and
       iii) upon determining that the supercapacitor does not contain charge and the battery does contain charge, powers the load on the charging device power output through the battery.

13. The portable charging device of claim 12, further comprising:
    i) the charging device management system having a standby logic that, upon determining that there is no input power on the charging device power input and that there is no load on the charging device power output:
       i) receives the battery charge status output and the supercapacitor charge status output,
       ii) upon determining that the supercapacitor contains charge and that the battery is not fully charged, recharges the battery using the charge contained in the supercapacitor.

14. The portable charging device of claim 10, further comprising:
    h) the charging device management system having an output logic that powers a load on the charging device power output through charge contained in the battery while using charge contained in the supercapacitor to recharge the battery.

15. A method for managing input and output power in a hybrid portable charging device containing a battery and a supercapacitor comprising:
   a) receiving a battery charge status output and a supercapacitor charge status output;
   b) determining whether the hybrid portable charging device is receiving input power;
   c) upon determining that the hybrid portable charging device is receiving input power:
      i) determining whether the input power is at a low, medium, or high level,
      ii) upon determining that the input power is at the high level, diverting all input power to the supercapacitor until the supercapacitor charge status output indicates that the supercapacitor is fully charged,
      iii) upon determining that the input power is at the low level, diverting all input power to the battery until the battery charge status output indicates that the battery is fully charged, and
      iv) upon determining that the input power is at the medium level, dividing the input power into a first portion that is diverted to the battery and a second portion that is diverted to the supercapacitor.

16. The method of claim 15, wherein the first portion of the input power is comprises a fixed power amount, and the second portion comprises an excess of the input power beyond the fixed power amount.

17. The method of claim 16, wherein the fixed power amount comprises a maximum amount of power that can be used to charge the battery.

18. The method of claim 15, further comprising:
   c) determining whether the hybrid portable charging device has a load on a power output;
   d) upon identifying the load:
      i) examining the battery charge status output and the supercapacitor charge status output;
      ii) upon determining that the supercapacitor contains charge, powering the load on the power output through the supercapacitor, and
      iii) upon determining that the supercapacitor does not contain charge and the battery does contain charge, powering the load on the power output through the battery.

19. The portable charging device of claim 18, further comprising:
   e) upon determining that there is no load on the power output and that the hybrid portable charging device is not receiving input power:
      i) examining the battery charge status output and the supercapacitor charge status output, and
      ii) upon determining that the supercapacitor contains charge and that the battery is not fully charged, recharging the battery using the charge contained in the supercapacitor.

20. The portable charging device of claim 15, further comprising:
   c) determining whether the hybrid portable charging device has a load on a power output;
   d) upon identifying the load, powering the load through charge contained in the battery while using charge contained in the supercapacitor to recharge the battery.

* * * * *